No. 639,930. Patented Dec. 26, 1899.
E. I. OLINGER.
REEL.
(Application filed Oct. 29, 1898.)
(No Model.)
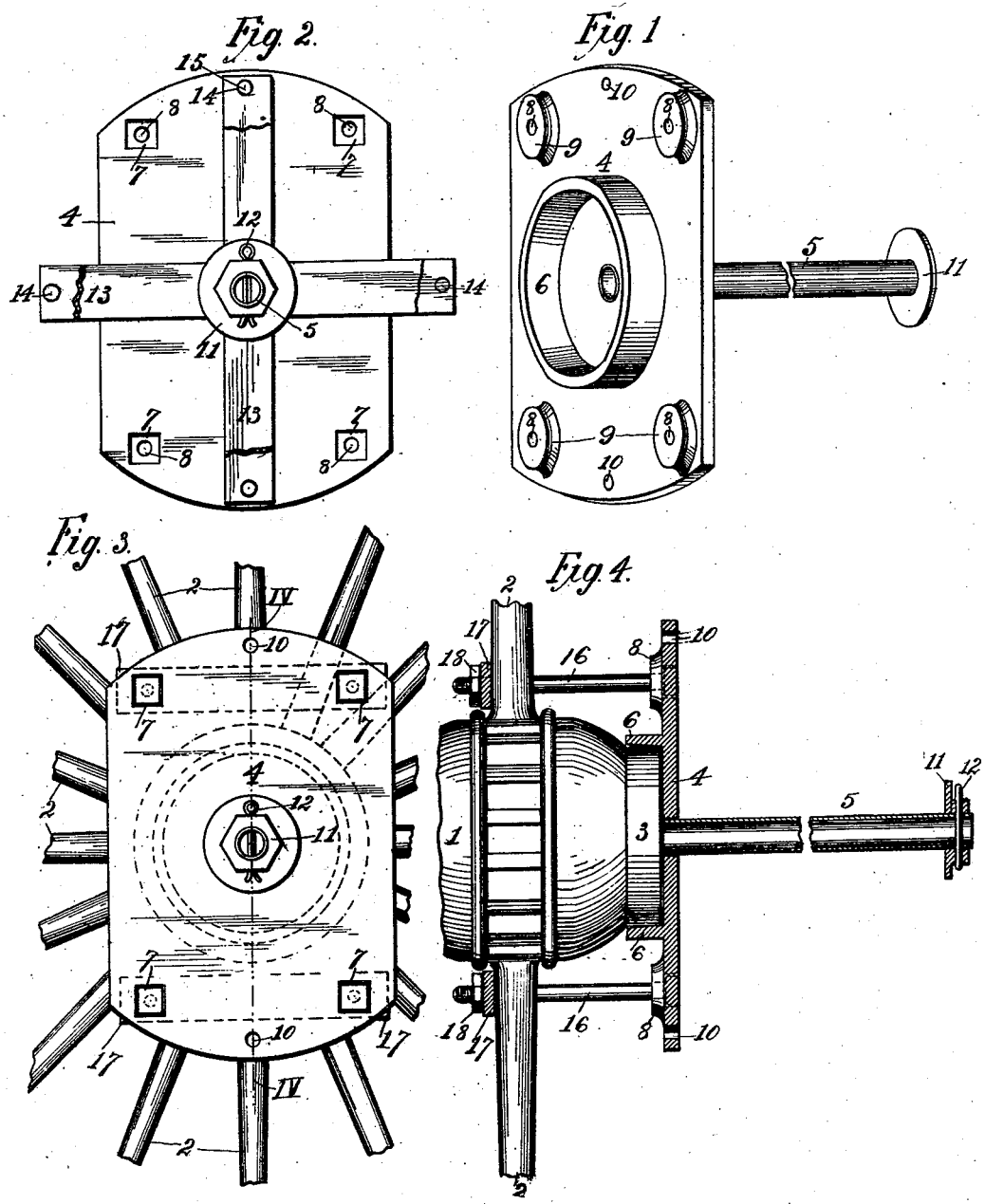
Witnesses:
C. F. Bartholomees.
F. S. Thrasher.
Inventor
E. I. Olinger.
By Higdon Fischer & Thorpe
Att'ys.

UNITED STATES PATENT OFFICE.

ELEMUEL ISAAC OLINGER, OF UNIONVILLE, MISSOURI.

REEL.

SPECIFICATION forming part of Letters Patent No. 639,930, dated December 26, 1899.

Application filed October 29, 1898. Serial No. 694,879. (No model.)

*To all whom it may concern:*

Be it known that I, ELEMUEL ISAAC OLINGER, a citizen of the United States, residing at Unionville, Putnam county, Missouri, have invented certain new and useful Improvements in Reels, of which the following is a specification.

My invention relates to reels for building and repairing fences, and more especially is designed as an improvement over the reel illustrated and described in my patent issued February 22, 1898, and numbered 599,660, the object in this connection being to produce a reel which can be handled with more ease and convenience and can be used in many situations to a better advantage than the reel forming the subject of said patent.

With these objects in view the invention consists in certain novel and peculiar features of construction and combinations of parts, as will be hereinafter described and claimed, and in order that the invention may be fully understood reference is to be had to the accompanying drawings, in which—

Figure 1 is a perspective view of the attachment upon which the reel is mounted and by which it is easily and reliably connected to a vehicle of transportation, such as a wagon. Fig. 2 is an outer face view of the same with the reel supported thereby. Fig. 3 is an outer face view of the supporting attachment secured to a wagon-wheel. Fig. 4 is a vertical section taken on the line IV IV of Fig. 3.

In the said drawings, 1 designates the hub, 2 the spokes, and 3 the flange, of an ordinary wagon-wheel.

4 designates a vertical plate, to the center of which is screwed or otherwise secured the pipe or tube 5, said pipe or tube projecting at right angles to and outward from said plate. The plate is provided at its inner side with a circular flange 6, arranged concentrically of the pipe or tube 5 and of suitable diameter to snugly inclose the flange 3 of the wagon-wheel hub. Said plate at suitable points is provided with a plurality of sockets 7 in its outer face, said sockets by preference being of rectangular form, and 8 designates a corresponding number of bolt-holes formed in said plate and registering centrally with said sockets. To strengthen the plate at and near the points provided with said holes and sockets, it is formed at its inner side with a corresponding series of bosses or enlargements 9, and at suitable points the plate is also provided with perforations 10 for a purpose which will hereinafter appear.

11 designates a flanged nut which is fitted upon the outer end of the tube or pipe 5, and 12 an ordinary spring cotter or key extending diametrically through said nut and said tube or pipe in order to retain in position the reel 13, journaled upon said tube or pipe, said reel being of the type shown or of any other suitable or preferred type, but provided, however, with holes or apertures 14 in its inner side, which are adapted to successively register with one or another of the apertures 10 of plate 4 in order that a pin 15 may be fitted in said registering holes to lock the reel to the plate temporarily for a purpose which will hereinafter appear.

In order to secure the plate 4 reliably to the wheel, it is fitted, as stated, upon the flange of the hub, and then bolts 16 are fitted through the holes 8 of said plate until their squared heads enter the corresponding sockets 7 of said plates, and their threaded ends project through the opposite spaces between two adjacent spokes. Apertured plates 17 are then fitted upon said bolts and are clamped up against the inner side of said spokes by means of the clamping-nuts 18, which thereby serve to secure the plate 4 reliably to the wheel.

In building wire fences the wire may be tensioned after its free end is secured to one or more posts by moving the wagon in the direction to properly turn the reel and wind the wire thereon, provided the reel-arm and plate be locked together by means of the pin 15. The preferred way, however, of tensioning or tightening the wire after a sufficient length has been paid out is to jack up the wheel of the wagon carrying the reel and then, after utilizing the pin 15 to lock the reel and plate together, to grasp and turn the wheel in the proper direction. By this method the operator obtains a great leverage and at the same time will know just when the wire is properly tensioned and will not be apt to break it or pull it away from any of the posts by tensioning it too much, as is apt to be the case where the wire is tensioned by moving the wagon, because the latter cannot always be stopped at the instant necessary, as will be understood. If the wire is cut at any particular point along the fence, the loose wire may be rewound on the reel by simply turning the latter and not moving the wagon, and in places where it would be impossible to drive the wagon the free end of the wire may be grasped and drawn through the brush or other impediment and secured at the required point.

This reel may be used in other places and connections not necessary to be mentioned here where it would be difficult or impossible to properly handle a reel which turns only with the wagon-wheel, and it is to be understood that I reserve the right to make such changes in the form, proportion, detail construction, or arrangement of parts as will not be a departure from the spirit and scope of the invention.

Having thus described the invention, what I claim as new, and desire to secure by Letters Patent, is—

The combination of a wheel, an apertured plate 4, having rectangular recesses 7 in its outer side which register with the apertures thereof, and provided with a hole 10, and an inwardly-projecting circular flange 6, externally embracing the hub-flange 3, a shaft or pipe 5, projecting outward from the center of the plate, a collar 11 thereon, a spring-cotter 12, extending through the collar and the shaft or pipe, bolts 16 projecting from plate 4, between the spokes of the wheel, and having square heads fitting in the recesses 7, bars 17 upon said bolts at the inner side of the wheel, clamping-nuts 18, engaging said bolts and clamping the bars firmly against the inner sides of the spokes, an apertured reel journaled on the shaft or pipe 5, and a pin to lock the reel and plate together by engaging the hole 10 and the aperture of the reel, all arranged substantially as and for the purpose described.

In testimony whereof I affix my signature in the presence of two witnesses.

ELEMUEL ISAAC OLINGER.

Witnesses:
A. M. BERRY,
L. S. K. McCUTCHEN.